(12) United States Patent
Suzuki et al.

(10) Patent No.: US 11,135,666 B2
(45) Date of Patent: Oct. 5, 2021

(54) CROWNING FORMING METHOD AND CROWNING FORMING APPARATUS

(71) Applicant: TOYOTA JIDOSHA KABUSHIKI KAISHA, Toyota (JP)

(72) Inventors: Toshitaka Suzuki, Okazaki (JP); Takeshi Endoh, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 16/199,373

(22) Filed: Nov. 26, 2018

(65) Prior Publication Data
US 2019/0193177 A1 Jun. 27, 2019

(30) Foreign Application Priority Data
Dec. 26, 2017 (JP) .............................. JP2017-249930

(51) Int. Cl.
| | | |
|---|---|---|
| B23F 19/00 | (2006.01) | |
| B21K 1/30 | (2006.01) | |
| F16H 55/17 | (2006.01) | |
| B23F 23/00 | (2006.01) | |
| F16H 55/08 | (2006.01) | |

(52) U.S. Cl.
CPC .............. B23F 19/002 (2013.01); B21K 1/30 (2013.01); F16H 55/17 (2013.01); *B23F 23/003* (2013.01); *F16H 55/088* (2013.01)

(58) Field of Classification Search
CPC ................................ B23F 19/002; B21K 1/30
See application file for complete search history.

(56) References Cited

U.S. PATENT DOCUMENTS

| 4,597,282 A | 7/1986 | Hogenhout | |
| 4,945,749 A * | 8/1990 | Walker | ..................... B21C 23/03 |
| | | | 72/356 |
| 6,178,801 B1 | 1/2001 | Ishida | |
| 7,677,073 B2 * | 3/2010 | Tanabe | ..................... B21K 1/30 |
| | | | 72/352 |

FOREIGN PATENT DOCUMENTS

| JP | 7-323346 | 12/1995 |
| JP | 11-254083 | 9/1999 |
| JP | 2003-117629 | 4/2003 |
| JP | 2010-201442 | 9/2010 |
| JP | 2014-217876 | 11/2014 |

* cited by examiner

*Primary Examiner* — Moshe Wilensky
*Assistant Examiner* — Kyle A Cook
(74) *Attorney, Agent, or Firm* — Oblon, McClelland, Maier & Neustadt, L.L.P.

(57) ABSTRACT

A tooth shape of the first tooth-shaped die part is formed have a constant tooth width from an upper end to a lower end and to correspond to a tooth width of a part in which a desired crowning has been produced. A tooth shape of the second tooth-shaped die part is formed to have a constant tooth width from an upper end to a lower end and to correspond to a tooth width of a central part, which is a part other than the part in which the desired crowning has been produced. A crowning forming method includes the steps of: forming a tooth shape on an outer circumference of the material by the tooth shape of the first tooth-shaped die part; and pressing the central part of the tooth shape of the material against the tooth shape of the inner circumference of the second tooth-shaped die part.

4 Claims, 12 Drawing Sheets

CROWNING FORMING METHOD AND CROWNING FORMING APPARATUS

CROSS REFERENCE TO RELATED APPLICATIONS

This application is based upon and claims the benefit of priority from Japanese patent application No. 2017-249930, filed on Dec. 26, 2017, the disclosure of which is incorporated herein in its entirety by reference.

BACKGROUND

The present disclosure relates to a crowning forming method and a crowning forming apparatus for forming a tooth-shaped crowning.

A crowning forming method for forming a tooth shape in an annular material by hobbing or the like, and then performing shaving or the like, thereby forming crowning has been known (see, for example, Japanese Unexamined Patent Application Publication No. H07-323346).

In the aforementioned crowning forming method, a plurality of processes such as the hobbing, the shaving and the like are combined with one another. Therefore, the apparatus needs to be changed or changeover needs to be performed for each process, which may lead to an increase in the man-hours and the cost.

SUMMARY

The present disclosure has been made in order to solve the aforementioned problem and mainly aims to provide a crowning forming method and a crowning forming apparatus capable of forming a tooth-shaped crowning by a simple method.

One aspect of the present disclosure in order to achieve the aforementioned object is a crowning forming method in which a desired crowning is formed in a tooth shape formed on an outer circumference of an annular material by a cylindrical die, in which the cylindrical die comprises a first tooth-shaped die part and a second tooth-shaped die part, a tooth shape of the first tooth-shaped die part being formed on an inner circumference to have a constant tooth width from an upper end part to a lower end part and to correspond to a tooth width of a part in which the desired crowning has been produced, and a tooth shape of the second tooth-shaped die part being formed on an inner circumference to have a constant tooth width from an upper end part to a lower end part and to correspond to a tooth width of a central part, which is a part other than the part in which the desired crowning has been produced, the method comprising the steps of:

forming a tooth shape on an outer circumference of the material by the tooth shape of the inner circumference of the first tooth-shaped die part; and moving the material in which the tooth shape is formed into the second tooth-shaped die part, and pressing the inner circumferential surface of the material outwardly in such a way that the diameter of the central part extends more greatly than the diameter of each of the upper and lower end parts of the material, thereby pressing the central part of the tooth shape of the material against the tooth shape of the inner circumference of the second tooth-shaped die part.

In this aspect, a cylindrical mandrel may be arranged in the center of the cylindrical die, and the annular material may be inserted into the mandrel, whereby a tooth-shaped crowning may be formed on the outer circumference of the material.

In this aspect, a rod-like inserted part having a tip end side formed in a tapered shape may be inserted into the cylindrical mandrel, the mandrel may be configured in such a way that a diameter of a position of the mandrel that corresponds to a central part of the second tooth-shaped die part becomes larger than a diameter of each of positions of the mandrel that correspond to upper and lower end parts of the second tooth-shaped die part, and the inserted part may be pressed into a tip end side of the mandrel and the diameter of the mandrel may be extended by a tapered shape of the inserted part, thereby extending the diameter of the central part more greatly than the diameter of each of the upper and lower end parts of the material.

One aspect of the present disclosure in order to achieve the aforementioned object may be a crowning forming method in which a desired crowning is formed in a tooth shape formed on an outer circumference of an annular material by first and second tooth-shaped die parts, in which a tooth shape of the first tooth-shaped die part being formed on an inner circumference to have a constant tooth width from an upper end part to a lower end part and to correspond to a tooth width of a part in which the desired crowning has been produced, a tooth shape of the second tooth-shaped die part being formed on an inner circumference to have a constant tooth width from an upper end part to a lower end part and to correspond to a tooth width of a central part, which is a part other than the part in which the desired crowning has been produced, the method comprising the steps of:

forming a tooth shape on an outer circumference of the material by the tooth shape of the inner circumference of the first tooth-shaped die part; and moving the material in which the tooth shape is formed into the second tooth-shaped die part, and pressing the inner circumferential surface of the material outwardly in such a way that the diameter of the central part extends more greatly than the diameter of each of the upper and lower end parts of the material, thereby pressing the central part of the tooth shape of the material against the tooth shape of the inner circumference of the second tooth-shaped die part.

One aspect of the present disclosure in order to achieve the aforementioned object may be a crowning forming apparatus configured to form a desired crowning in a tooth shape formed on an outer circumference of an annular material, the crowning forming apparatus comprising:

a cylindrical die comprising a first tooth-shaped die part and a second tooth-shaped die part, a tooth shape of the first tooth-shaped die part being formed on an inner circumference to have a constant tooth width from an upper end part to a lower end part and to correspond to a tooth width of a part in which the desired crowning has been produced, and a tooth shape of the second tooth-shaped die part being formed on an inner circumference to have a constant tooth width from an upper end part to a lower end part and to correspond to a tooth width of a central part, which is a part other than the part in which the desired crowning has been produced;

a material pressing part configured to press the annular material into the die and move the annular material; and a press part configured to press the inner circumferential surface of the material outwardly in such a way that the diameter of the central part extends more greatly than the diameter of each of the upper and lower end parts of the material, thereby pressing the central part of the tooth shape of the material against the tooth shape of the inner circumference of the second tooth-shaped die part.

In this aspect, the press part may include:

a cylindrical mandrel positioned in the center of the cylindrical die and configured in such a way that a diameter of a position of the mandrel that corresponds to a central part of the second tooth-shaped die part becomes larger than a diameter of each of positions of the mandrel that correspond to upper and lower end parts of the second tooth-shaped die part;

a rod-like inserted part having a tip end side formed in a tapered shape, the rod-like inserted part being inserted into the cylindrical mandrel and pressed into the tip end side of the mandrel, thereby extending an outer diameter of the tip end side of the mandrel; and an insertion pressing part configured to press the inserted part to the tip end side of the mandrel.

In this aspect, a throughhole may be formed in the material pressing part in an axial direction, and the insertion pressing part may be inserted into the throughole of the material pressing part and include a first pin configured to press a rear end of the inserted part and a second pin configured to press the first pin arranged in the rear end of the first pin to a tip end side of the mandrel.

According to the present disclosure, it is possible to provide a crowning forming method and a crowning forming apparatus capable of forming a tooth-shaped crowning in a simple method.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, embodiments of the present disclosure will be explained.

First Embodiment

A crowning forming apparatus according to a first embodiment of the present disclosure cold-forges, for example, a tooth shape such as a helical gear in an annular material, and further upsets crowning in this tooth shape.

Figure 1:
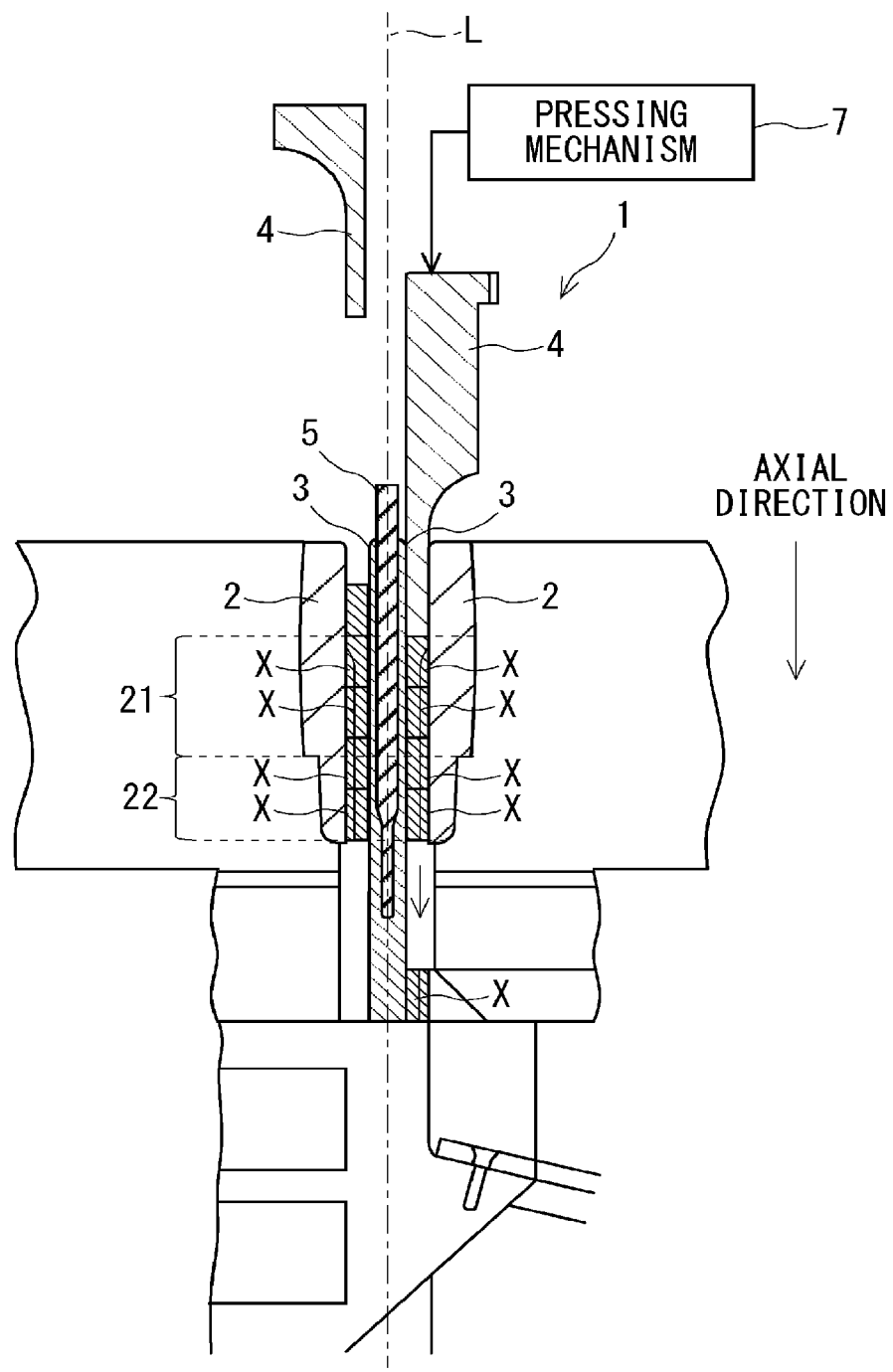
FIG. 1 is a diagram showing a schematic configuration of a crowning forming apparatus according to a first embodiment of the present disclosure.
Figure 2:
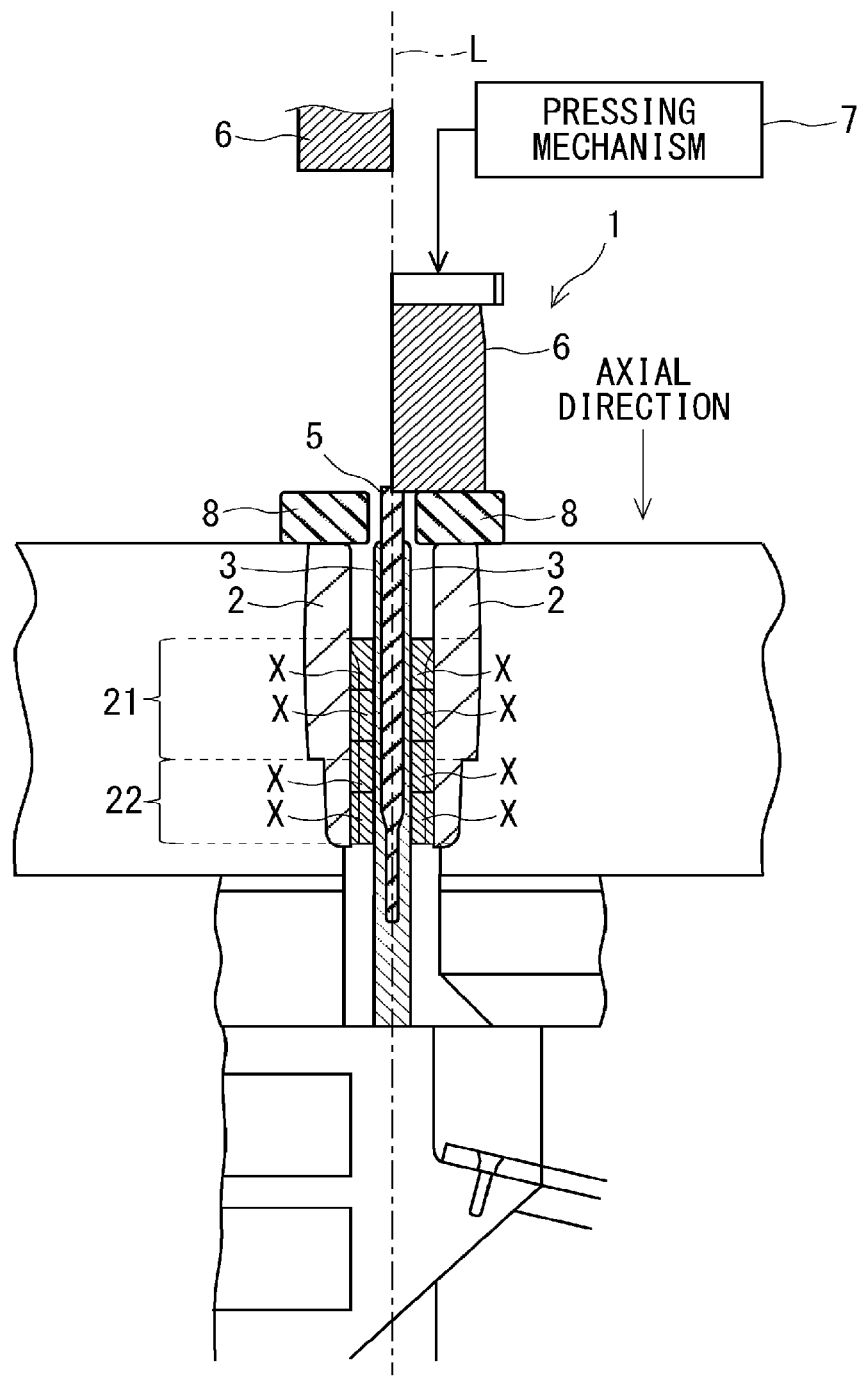
FIG. 2 is a diagram showing a schematic configuration of the crowning forming apparatus according to the first embodiment of the present disclosure.

FIGS. 1 and 2 are diagrams each showing a schematic configuration of the crowning forming apparatus according to the first embodiment of the present disclosure. FIG. 1 is a diagram showing a state in which an annular material is pressed into a tip end side of a mandrel by a material pressing part. In FIG. 1, the left side of a central axis line L of the mandrel 3 shows a state before the material is pressed into the tip end side of the mandrel and the right side of the central axis line L shows a state after the material is pressed into the tip end side of the mandrel.

FIG. 2 is a diagram showing a state in which an inserted part is pressed into the tip end side of the mandrel by an insertion pressing part. In FIG. 2, the left side of the central axis line L shows a state before the inserted part is pressed into the tip end side of the mandrel and the right side of the central axis line L shows a state after the inserted part is pressed into the tip end side of the mandrel.

A crowning forming apparatus 1 according to the first embodiment includes a cylindrical die 2, a cylindrical mandrel 3, a material pressing part 4 that presses a material X, an inserted part 5 inserted into the cylindrical mandrel 3, and an insertion pressing part 6 that presses the inserted part 5 into the cylindrical mandrel 3.

The cylindrical die 2 includes a first tooth-shaped die part 21 on the upper side thereof and a second tooth-shaped die part 22 that is arranged on the lower side of the first tooth-shaped die part 21 and is connected to the first tooth-shaped die part 21. The first tooth-shaped die part 21 and the second tooth-shaped die part 22 may be integrally formed.

It is assumed here that the crowning forming apparatus 1 produces a desired crowning in the material X. The first tooth-shaped die part 21 is a tooth-shaped die in which a tooth shape is formed on an inner circumference thereof to have a constant tooth width from an upper end part to a lower end part of the first tooth-shaped die part 21 and to correspond to a tooth width of a part in which the desired crowning has been produced. The tooth shape is formed on the inner circumference of the first tooth-shaped die part 21 in such a way that, for example, the tooth shape is formed to have a constant tooth width from the upper end part to the lower end part of the material X with the tooth width of the part where the desired crowning has been produced.

The second tooth-shaped die part 22 is a tooth-shaped die in which a tooth shape is formed on an inner circumference thereof to have a constant tooth width from an upper end part to a lower end part of the second tooth-shaped die part 22 and to correspond to a tooth width of a central part, which is a part other than the part in which the desired crowning has been produced. The tooth shape is formed on the inner circumference of the second tooth-shaped die part 22 in such a way that, for example, the tooth shape is formed to have a constant tooth width from the upper end part to the lower end part of the material X with the tooth width of the central part in which the desired crowning is not produced. The tooth shape of the second tooth-shaped die part 22 is formed so as to correspond to the final target dimension of the tooth shape formed in the material X.

The tooth shape of the first tooth-shaped die part 21 is formed to be smaller than that of the second tooth-shaped die part 22 by an amount corresponding to the size of the area where crowning is to be produced. In contrast, the tooth shape of the second tooth-shaped die part 22 is offset and extended by an amount corresponding to the size of the area where crowning is to be produced in the circumferential direction with respect to the tooth shape of the first tooth-shaped die part 21.

Figure 3:
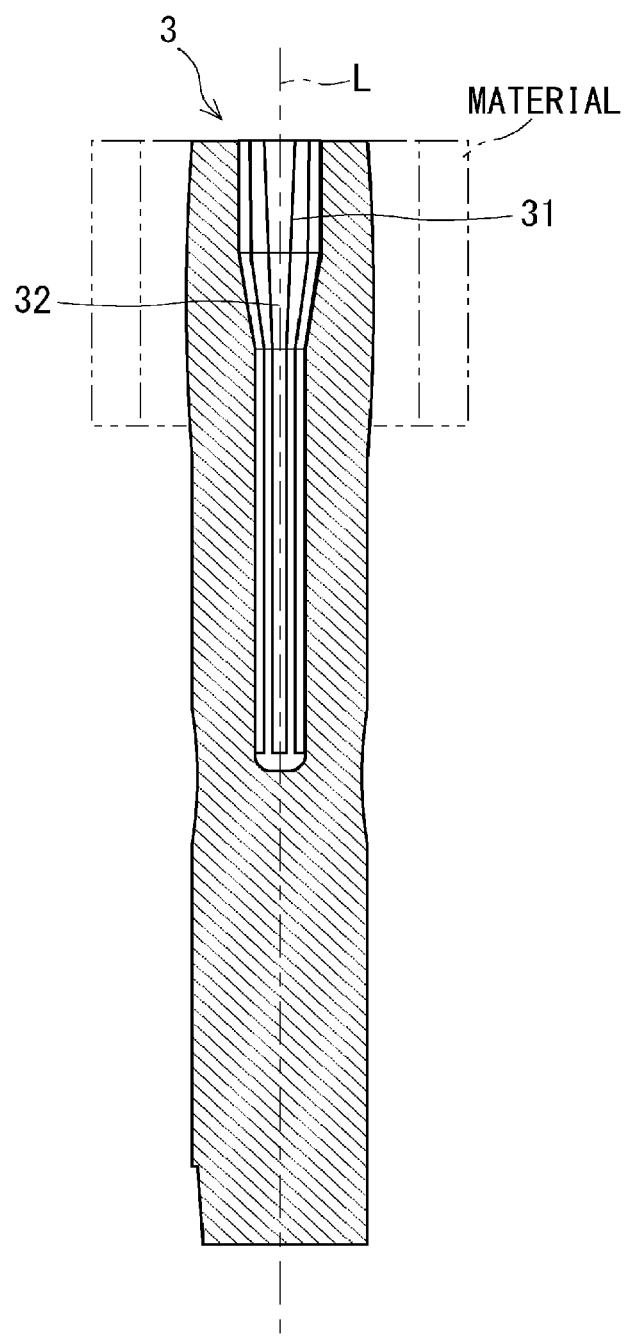
FIG. 3 is a cross-sectional view in which a tip end side of a mandrel is partially enlarged.

The cylindrical mandrel 3 is inserted into the cylindrical die 2 and is arranged at the center of the die 2. The mandrel 3 includes a hole 31 formed in the axial direction. FIG. 3 is a cross-sectional view in which the tip end side of the mandrel is partially enlarged. As shown in FIG. 3, a tapered shaped part 32 whose inner diameter is gradually reduced is formed in the position that corresponds to the second tooth-shaped die part 22 on the tip end side of the hole 31 of the mandrel 3.

Figure 4:
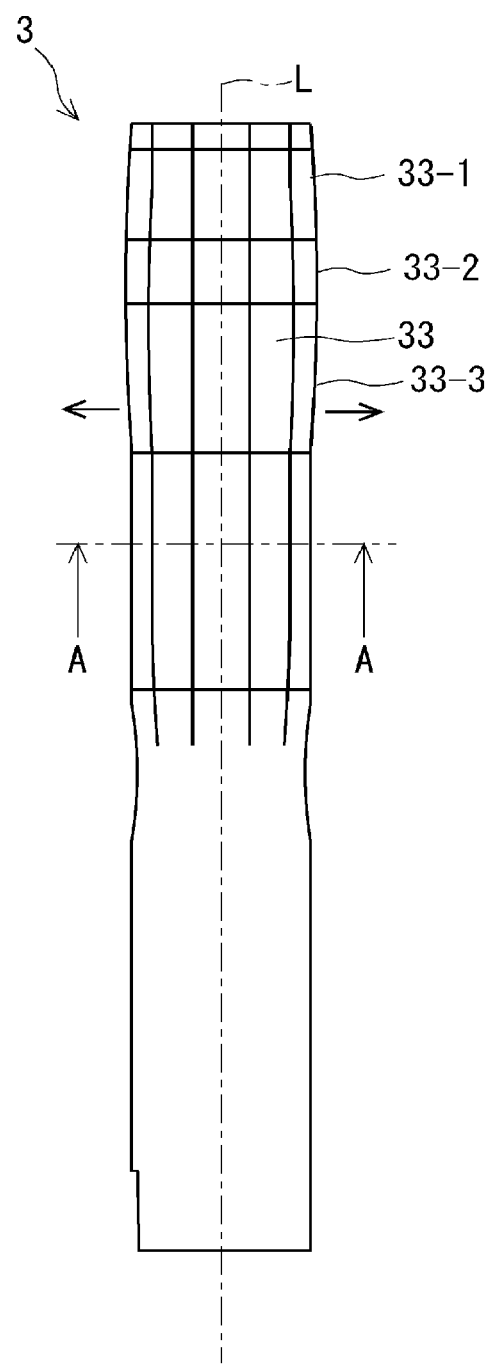
FIG. 4 is a diagram showing a tea whisk structure of the mandrel at a position that corresponds to a second tooth-shaped die part.
Figure 5:
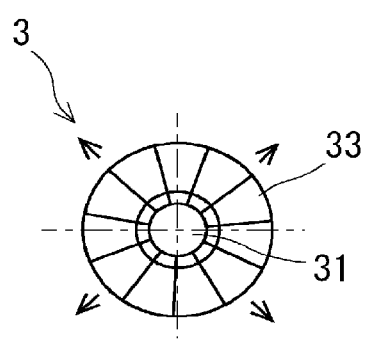
FIG. 5 is a cross-sectional view of the tea whisk structure shown in FIG. 4 taken along the line A-A.

The tapered shaped part 32 of the mandrel 3 has, for example, a tea whisk structure 33. FIG. 4 is a diagram showing the tea whisk structure 33 in the position that corresponds to the second tooth-shaped die part 22 of the mandrel 3. FIG. 5 is a cross-sectional of the tea whisk structure shown in FIG. 4 taken along the line A-A.

As shown in FIG. 5, the tea whisk structure 33 has, for example, a structure in which the position that corresponds to the second tooth-shaped die part 22 of the mandrel 3 is equally divided into 12 parts in the circumferential direction. The tea whisk structure 33 has such a structure as to change the outer diameter dimension of the tip end part and to open the tip end part radially.

The tip end part of the tea whisk structure 33 is configured in such a way that the diameter of the position that corresponds to the central part of the second tooth-shaped die part 22 becomes larger than the diameter of each of the positions that correspond to the upper and lower end parts. For example, as shown in FIG. 4, at the tip end part of the tea whisk structure 33, the diameter of a central part 33-2 is set to be larger than the diameter of each of an upper part 33-1 and a lower part 33-3. The shape in which the central part 33-2 is greatly swollen to the outside than the upper part 33-1 and the lower part 33-3 on the respective sides of the central part 33-2 are will be referred to as a barrel shape.

In the first embodiment, as described above, the crowning shape is not formed in any one of the first tooth-shaped die part 21 and the second tooth-shaped die part 22. A crowning forming principle according to the first embodiment will now be explained in detail.

In the first embodiment, the inner circumferential surface of the material is pressed outwardly in such a way that the diameter of the central part is greatly extended than the diameter of each of the upper and lower end parts of the material X, whereby the central part of the tooth shape of this material is pressed against the tooth shape of the inner circumference of the second tooth-shaped die part 22.

That is, when the tea whisk structure 33 of the mandrel 3 opens radially, due to this barrel shape, the central part 33-2 presses each corresponding inner circumferential surface of the material outwardly more strongly than the upper part 33-1 and the lower part 33-3 do. Accordingly, the diameter of the central part of the material X that corresponds to the central part 33-2 of the tea whisk structure 33 is extended greatly than the diameter of each of the upper and lower end parts of the material X that correspond to the upper part 33-1 and the lower part 33-3 of the tea whisk structure 33.

The diameter of the central part of the material X is greatly extended and thus the central part of the material X is pressed against the tooth shape of the inner circumference of the second tooth-shaped die part 22. Accordingly, the tooth width of the central part of the material X is extended, and is formed to have a tooth shape having a target dimension in accordance with the tooth shape of the second tooth-shaped die part 22.

On the other hand, the diameter of each of the upper and lower end parts of the material X is not extended much and thus the upper and lower end parts of the material X are not pressed against the tooth shape of the inner circumference of the second tooth-shaped die part 22. Accordingly, the upper and lower end parts of the material X maintain to have a tooth shape whose size is smaller than the target dimension formed by the first tooth-shaped die part 21 without extending the tooth width. A natural crowning shape is formed in the material X by the aforementioned difference in the shape between the central part of the material X and the upper and lower end parts.

The aforementioned tea whisk structure 33 is merely one example and is not limited to the one that has been described above. For example, the equal division number of the tea whisk structure 33 in the circumferential direction may be a desired number.

The mandrel 3 penetrates a hole of the material X. The material X is inserted between the mandrel 3 and the die 2. As shown in FIGS. 1 and 2, for example, the materials X are continuously inserted into the mandrel 3 and are arranged between the mandrel 3 and the die 2 in such a manner that they are stacked on one another.

The material pressing part 4 is arranged, for example, above the die 2 in such a way that it can move in the vertical direction. The material pressing part 4 is formed, for example, in a substantially cylindrical shape, and presses the rear end of the material X at the tip end part thereof. The material pressing part 4 is pressed by a pressing mechanism 7 that is driven by, for example, a motor, hydraulic pressure, or pneumatic pressure and moves in the vertical direction.

Figure 6:
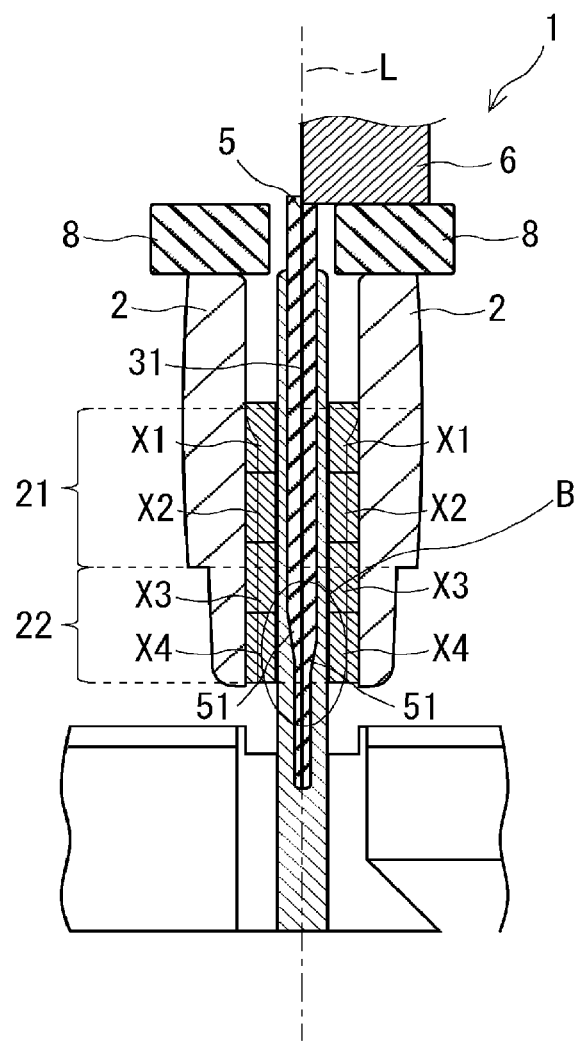
FIG. 6 is a diagram showing a state in which an inserted part is inserted into a hole of the mandrel.

FIG. 6 is a diagram showing a state in which the inserted part is inserted into the hole of the mandrel.

The inserted part 5 is formed, for example, in a rod shape and is inserted into the hole 31 of the mandrel 3. The tip end side of the inserted part 5 includes a tapered shaped part 51 whose diameter gradually decreases along the tip so as to correspond to the tapered shaped part 32 of the hole 31 of the mandrel 3.

The inserted part 5 is inserted into the hole 31 of the mandrel 3 and is pressed into the tip end side of the mandrel 3, whereby the tapered shaped part 51 of the inserted part 5 comes into contact with the tapered shaped part 32 of the mandrel 3 and the tea whisk structure 33 of the mandrel 3 is opened radially (FIGS. 4 and 5).

Figure 7:
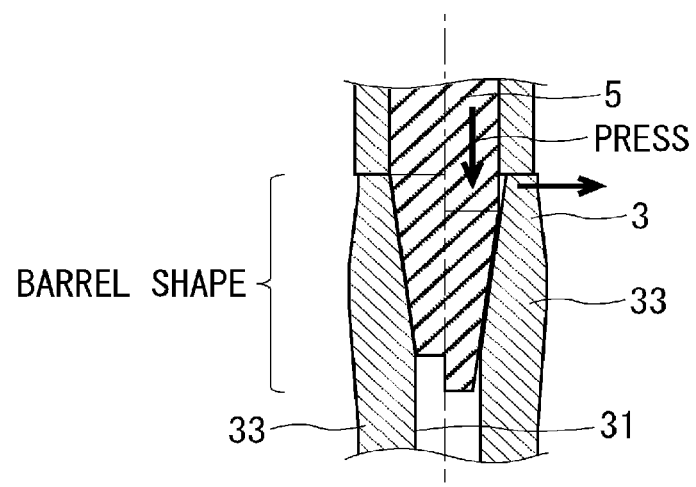
FIG. 7 is a diagram showing an enlarged B part shown in FIG. 6 and shows a barrel shape having the tea whisk structure.

At this time, the tea whisk structure 33 of the mandrel 3 has a barrel shape in which the central part thereof bulges like a mountain in the vertical direction. FIG. 7 is a diagram in which the B part shown in FIG. 6 is enlarged, and is a diagram showing a barrel shape of the tea whisk structure. As shown in FIG. 7, when the inserted part 5 is pressed into the tip end side of the mandrel 3 in the hole 31 of the mandrel 3, the barrel shape of the tea whisk structure 33 opens radially outward with the tip end side as a fulcrum. Since the central part (top part) of the barrel shape of the tea whisk structure 33 protrudes outward largely than the upper and lower parts, the central part comes into contact with the inner circumference of the material X more strongly.

Therefore, the tea whisk structure 33 of the mandrel 3 presses a part around the central part in the vertical direction of the inner circumference of the material X more strongly. The diameter of the part around the central part of the outer circumference of the material X is extended and the tooth shape thereof is strongly pressed against the tooth shape of the second tooth-shaped die part 22. Accordingly, the part around the central part (central part of the tooth width) is formed with the precision of the tooth shape of the second tooth-shaped die part 22. On the other hand, the diameter of each of the upper end and the lower end, which are parts other than the central part of the material X, is not greatly extended and thus the upper end and the lower end are not pressed against the second tooth-shaped die part 22. Due to the difference of the extension amount of the diameter between the central part and each of the upper and lower end parts of the material X, a natural crowning shape is formed in the material X.

In this way, the diameter of the tapered shaped part 32 of the mandrel 3 is extended, whereby it is possible to press the tooth shape of the material X against the tooth shape of the second tooth-shaped die part 22 and to thereby upset the crowning in the tooth shape of the material X.

As described above, in the first embodiment, first, the tooth shape having a size smaller than the target dimension is formed on the outer circumference of the material X by the first tooth-shaped die part 21. Next, the diameter of the part around the central part of the material X is extended to become larger by the inserted part 5 and the part around the central part of the material X is pressed against the tooth shape of the inner circumference of the second tooth-shaped die part 22. Accordingly, a natural crowning shape can be formed in the material X by a typical tooth-shaped die shape without requiring a complicated crowning shape that needs to be formed in the die itself in conventional techniques. Further, crowning can be formed in the tooth shape by the process and the device the same as those in the case in which the tooth shape of the material X is formed.

The insertion pressing part 6 is formed in, for example, a columnar shape, as shown in FIG. 2, and presses the rear end of the inserted part 5 at the tip end part thereof. The insertion pressing part 6 is arranged, for example, above the inserted part 5 in such a way that it can move in the vertical direction. The insertion pressing part 6 is pressed, for example, by the pressing mechanism 7 or the like and moves in the vertical direction, similar to the material pressing part 4.

An adjustment spacer 8 for regulating the amount of the downward movement of the insertion pressing part 6 is provided in the rear end of the die 2. The insertion pressing part 6 comes into contact with the adjustment spacer 8, which prevents the insertion pressing part 6 from moving downwardly any longer and the movement thereof is thus regulated. By adjusting the thickness of the adjustment spacer 8, the amount of the downward movement of the insertion pressing part 6 can be adjusted. Accordingly, by adjusting the amount of the inserted part 5 pressed into the tip end side of the mandrel 3 and adjusting the extension amount of the diameter of the tapered shaped part 32 of the mandrel 3, the crowning shape of the tooth shape of the material X can be adjusted. In the first embodiment, the thickness of the adjustment spacer 8 is adjusted in such a way that crowning can be optimally formed in the tooth shape of the material X. The crowning shape of the tooth shape of the material X may be adjusted by adjusting the barrel shape of the tea whisk structure 33 of the mandrel 3.

Incidentally, in crowning forming methods according to related art, a plurality of processes such as hobbing, shaving and the like are combined with one another. Therefore, the apparatus needs to be changed or changeover needs to be performed for each process, which may lead to an increase in the man-hours and the cost.

On the other hand, in the crowning forming apparatus 1 according to the first embodiment, as described above, the tooth shape is formed on the outer circumference of the material X by the tooth shape of the inner circumference of the first tooth-shaped die part 21 of the die 2, the material X in which the tooth shape is formed is moved into the second tooth-shaped die part 22, and the inner circumferential surface of the material X is outwardly pressed in such a way that the diameter of the central part is extended greatly than the diameter of each of the upper and lower end parts of the material X, whereby the central part of the tooth shape of the material X is pressed against the tooth shape of the inner circumference of the second tooth-shaped die part 22.

As described above, crowning is upset in the material X in which the tooth shape is formed by the first tooth-shaped die part 21 of the die 2 by the second tooth-shaped die part 22 in the same die 2. Therefore, crowning can be formed in the tooth shape by the process and the device the same as those in the case in which the tooth shape of the material X is formed. That is, the tooth-shaped crowning can be formed by a simple method.

Further, in related art, the first tooth-shaped die part is elastically deformed when crowning is formed in the material X in which the tooth shape is formed. On the other hand, in the crowning forming apparatus 1 according to the first embodiment, the crowning shape can be formed by a typical tooth-shaped die shape without requiring a complicated crowning shape that needs to be formed in the die itself in conventional techniques. Therefore, it is easy to manage the accuracy. Therefore, crowning can be formed in the tooth shape of the material X with a high accuracy.

As described above, while the die 2 does not have a crowning shape and has a constant tooth width from the upper end to the lower end, the crowning shape can be formed. Further, by changing the tip shape of the tea whisk structure 33 to a barrel shape, there is an advantage that only a simple change in the form in which the dimension decreases from the central part to the respective ends is required. That is, the tooth-shaped crowning can be formed by a simple method.

Further, since a die used at another process and the movement of the material X to another equipment are unnecessary, the tooth shape and the crowning can be formed in the material X at a low cost. When, in particular, the tooth shaping process and the crowning process according to related art are processes different from each other, besides the movement of the material X between the processes, a phase determination of the tooth shape and the like are performed when the material X is installed in the crowning process, which causes a problem that the cycle time increases. On the other hand, in the crowning forming apparatus 1 according to the first embodiment, as described above, crowning can be formed in the tooth shape by the process and the device the same as those in the case in which the tooth shape of the material X is formed. Therefore, the aforementioned time and effort can be saved and thus the cycle time can be dramatically reduced.

Figure 8:
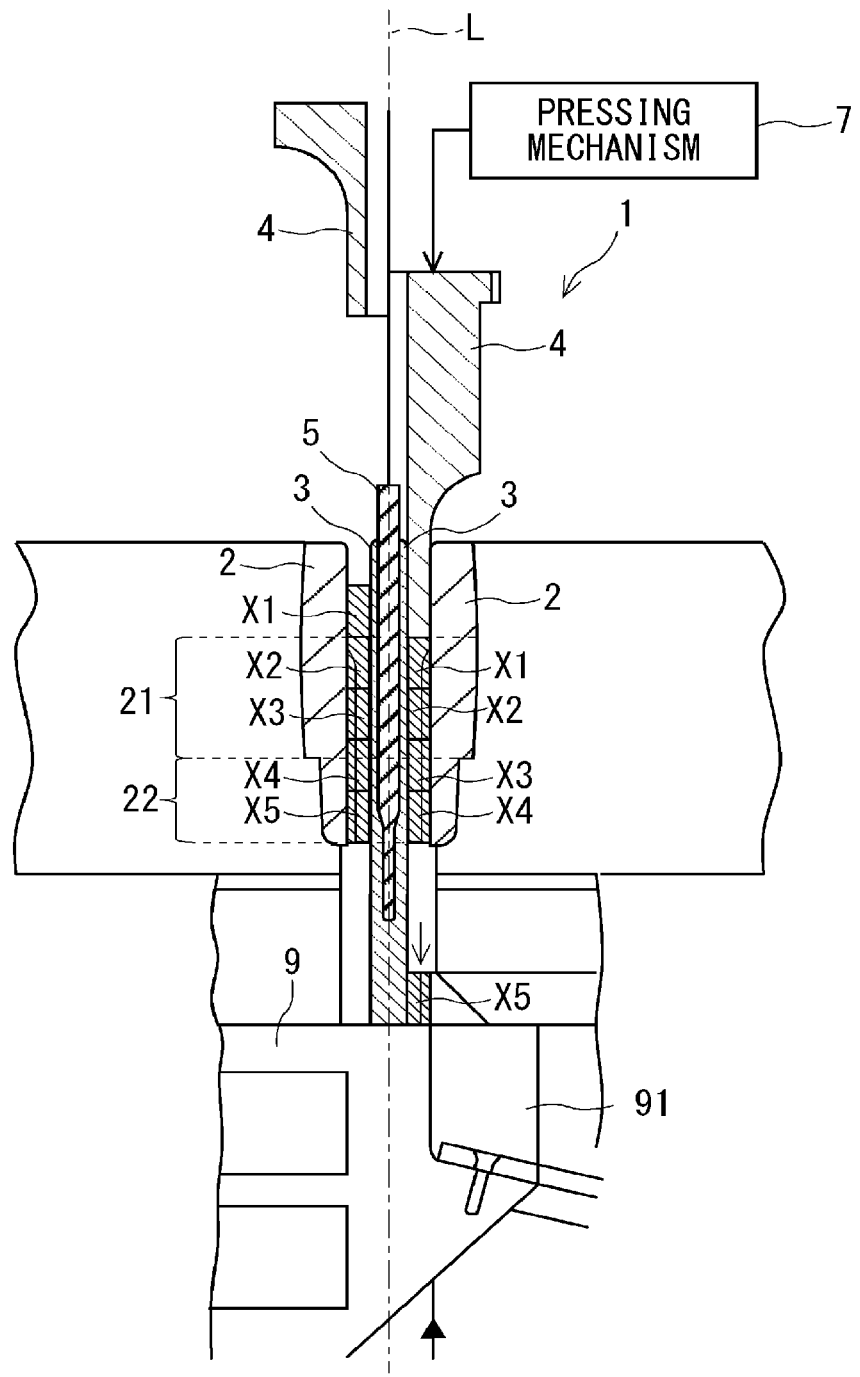
FIG. 8 is a diagram showing a process in which a tooth shape and crowning are continuously formed in each material.

FIG. 8 is a diagram showing a process in which the tooth shape and the crowning are continuously formed in each material. As shown in FIG. 8, the materials X are continuously inserted into the mandrel 3 and pass between the mandrel 3 and the die 2 in such a way that they are stacked on one another. In the meanwhile, the tooth shape and the crowning are formed in each of the materials X by the first tooth-shaped die part 21 and the second tooth-shaped die part 22. A material X2 is inserted into the mandrel 3 just before a material X1 is inserted and a material X3 is inserted into the mandrel 3 just before the material X2 is inserted. In a similar way, a material X4 is inserted into the mandrel 3 just before the material X3 is inserted and a material X5 is inserted into the mandrel 3 just before the material X4 is inserted.

For example, as shown in the left side of the central axis line L in FIG. 8, the material X1 is inserted into the mandrel 3. At this time, the material pressing part 4 is located at the top dead center before the forming is started.

Next, the material pressing part 4 is moved to the bottom dead center, thereby moving the material X1 downwardly from the position on the left side of the central axis line L to the position on the right side of the central axis line L by one stroke.

At the same time, the materials X2, X3, X4, and X5 are respectively pressed by the materials X1, X2, X3, and X4 located above them and are moved downwardly from the position on the left side of the central axis line L to the position on the right side of the central axis line L by one stroke. During this movement process, as the materials X1, X2, and X3 pass through the first tooth-shaped die part 21, the tooth shape is formed by the first tooth-shaped die part 21 on the outer circumference of each of the materials X1, X2, and X3.

When the material pressing part 4 has returned to the top dead center after the material X1 is formed and the material X4 is completely inserted into the second tooth-shaped die part 22, the material pressing part 4 is removed and the insertion pressing part 6 and the adjustment spacer 8 shown in FIG. 6 are used as a substitute for the material pressing part 4. As shown in the right side of the central axis line L in FIG. 6, the inserted part 5 is pressed into the tip end side of the mandrel 3, whereby the tapered shaped part 51 comes into contact with the tapered shaped part 32 of the mandrel 3 and the tapered shaped part 51 is outwardly expanded. Accordingly, the diameter of the tapered shaped part 32 of the mandrel 3 is extended, whereby the tooth shape of the material X4 is pressed against the tooth shape of the second tooth-shaped die part 22 and crowning is formed in the tooth shape of the material X4.

The material pressing part 4 is again returned to the state shown in FIG. 7 and the tooth shape forming is performed. As described above, the material X5 is moved downwardly by one stroke, whereby it is released from the second tooth-shaped die part 22 and freely falls downwardly. This material X5 is a formed finished product in which the tooth shape and the crowning are formed.

Figure 9:
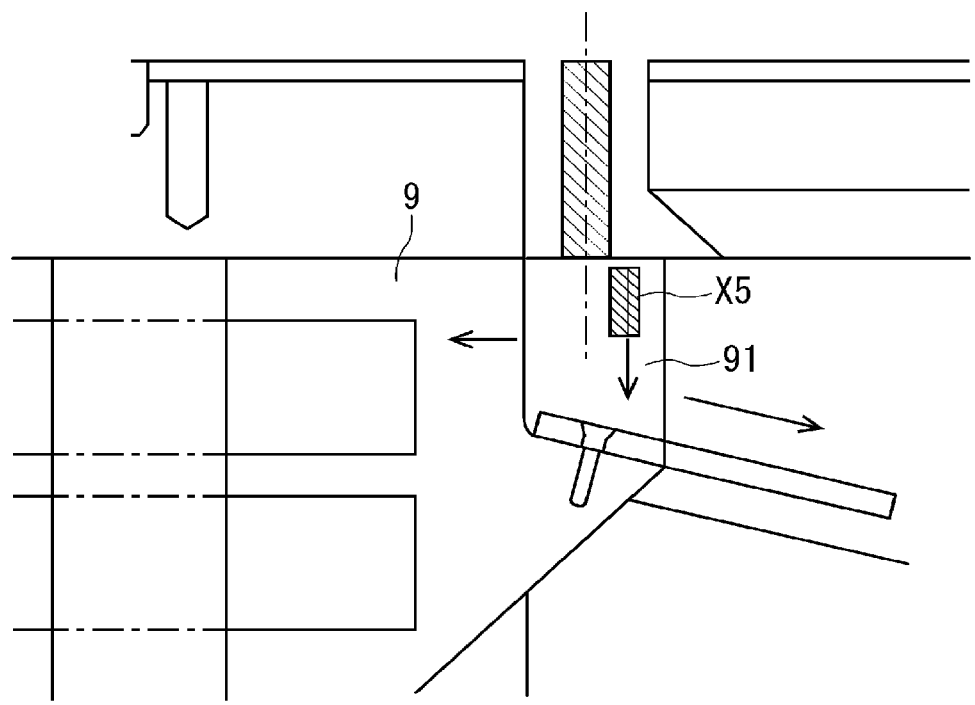
FIG. 9 is a diagram showing one example of a method of conveying the material.

In this state, the material X5, which is the finished product, remains on a spacer 9 at the tip of the mandrel 3, as shown in FIG. 8. As shown in FIG. 9, for example, a conveying outlet 91 of the spacer 9 moves to the tip of the mandrel 3 and the material X5 freely falls into this conveying outlet 91 and conveyed. Accordingly, it is possible to continuously convey the material X5, which is a finished product.

In the first embodiment, by repeating the aforementioned process, the tooth shape and the crowning can be efficiently formed in the respective materials X continuously inserted by the same process and the same apparatus.

In the first embodiment, as described above, the tooth shape of the material X is pressed against the tooth-shaped die that has a constant dimension from the upper end to the lower end of the inner circumference of the second tooth-shaped die part 22 and does not have a crowning shape, whereby crowning is formed in the tooth shape on the outer circumference of the material X.

That is, in this crowning forming principle, as described above, when the material X is enlarged radially in the outer diameter direction by the mandrel 3 in the second tooth-shaped die part 22, the diameter of the central part of the material X is extended to be greater than the diameter of each of the upper and lower end parts due to the difference in the outer diameter dimension on the tip end side of the mandrel 3. Because of the difference in the amount of the extension, only the tooth width of the central part of the tooth shape uniformly formed from the upper end to the lower end by the first tooth-shaped die part 21 is extended by the second tooth-shaped die part 22, whereby the crowning shape is shaped.

Accordingly, the dimension of the tooth shape of the inner circumference of the second tooth-shaped die part 22 may have a constant tooth width from the upper end to the lower end. Since the tooth width is constant, as described above, when the material X in which crowning is formed is pushed out from the second tooth-shaped die part 22, the material X can be conveyed smoothly in the state in which the crowning shape is maintained. Therefore, it is possible to continuously insert the material X into the mandrel 3 and to continuously form crowning in the material X that has been inserted. That is, crowning can be formed in the material X with a high efficiency.

Figure 10:
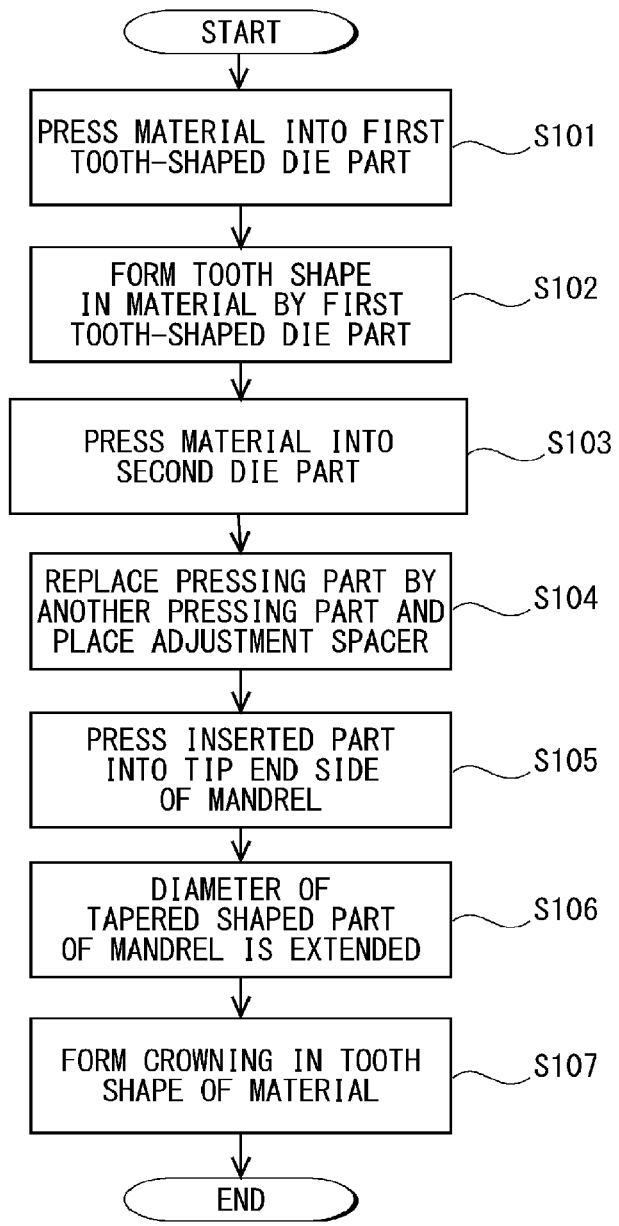
FIG. 10 is a flowchart showing a flow of a crowning forming method according to the first embodiment of the present disclosure.

Next, a crowning forming method according to the first embodiment will be explained in detail. FIG. 10 is a flowchart showing a flow of the crowning forming method according to the first embodiment.

The material pressing part 4 presses the material X into the first tooth-shaped die part 21 of the die 2 along the mandrel 3 (Step S101). Accordingly, the tooth shape is formed on the outer circumference of the material X by the tooth shape of the first tooth-shaped die part 21 (Step S102).

The material pressing part 4 further presses the material X in which the tooth shape is formed into the second tooth-shaped die part 22 of the die 2 along the mandrel 3 (Step S103).

Now, the material pressing part 4 is replaced by the insertion pressing part 6 and a predetermined adjustment spacer 8 is placed on the die 2 (Step S104).

The insertion pressing part 6 presses the inserted part 5 into the tip end side of the mandrel 3 (Step S105). Accordingly, the diameter of the tapered shaped part 32 of the mandrel 3 is extended (Step S106), whereby the tooth shape of the material X is pressed against the tooth shape of the second tooth-shaped die part 22 and crowning is formed in the tooth shape of the material X (Step S107).

As described above, according to the crowning forming method of the first embodiment, crowning can be formed in the tooth shape by the process and the apparatus the same as those when the tooth shape of the material X is formed. Further, by a typical tooth-shaped die shape, the crowning shape can be formed in the material X with a high accuracy without requiring a complicated crowning shape that needs to be formed in the die itself in conventional techniques. That is, the tooth-shaped crowning can be formed by the simple method.

Second Embodiment

Figure 11:
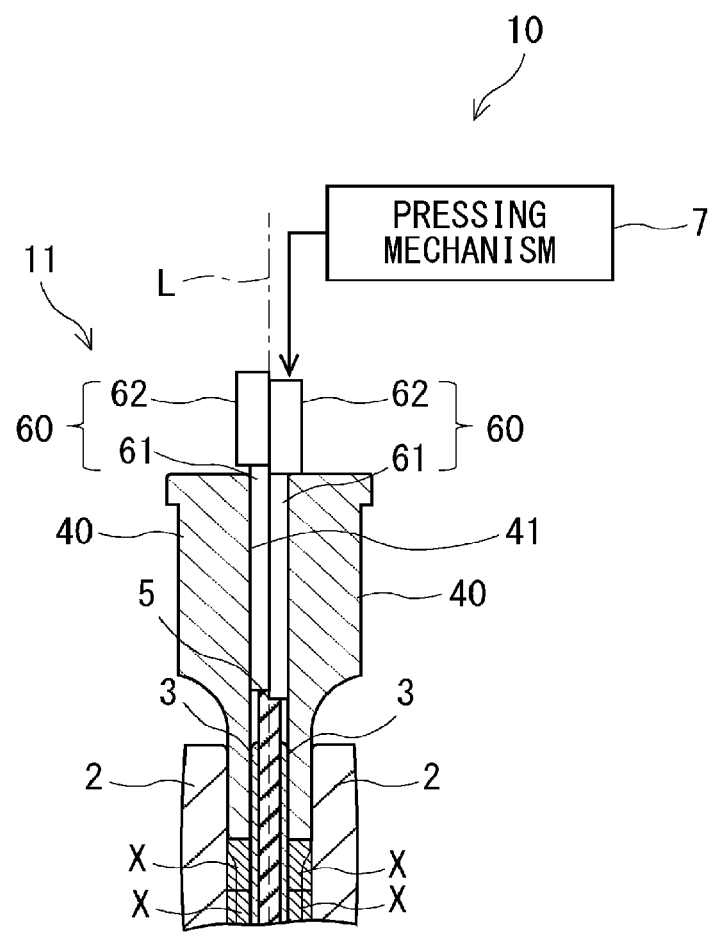
FIG. 11 is a diagram showing a schematic configuration of a crowning forming apparatus according to a second embodiment of the present disclosure.

FIG. 11 is a diagram showing a schematic configuration of a crowning forming apparatus according to a second embodiment of the present disclosure. A crowning forming apparatus 10 according to the second embodiment of the present disclosure may be configured to include a pressing member 11 in which the material pressing part 4 and the insertion pressing part 6 according to the aforementioned first embodiment are integrally formed. Accordingly, the changeover operation in which the material pressing part is replaced by the insertion pressing part can be eliminated, whereby the tooth-shaped crowning can be formed by a simpler method. Further, it is possible to reduce the cycle time and thus further reduce the manufacturing cost.

The pressing member 11 includes a first pressing part (material pressing part) 40 that presses the material X and a second pressing part (insertion pressing part) 60 that presses the inserted part 5. The first pressing part 40 is arranged above the die 2 in such a way that it can move in the vertical direction. The first pressing part 40 is a substantially cylindrical member in which a throughhole 41 is formed in the axial direction. The first pressing part 40 presses the rear end part of the material X at the tip end part thereof.

The second pressing part 60 is a rod-like member. The second pressing part 60 is inserted into the throughhole 41 of the first pressing part 40 and can be moved in the vertical direction. The second pressing part 60 is inserted into the throughhole 41 of the first pressing part 40, and is formed of a first pin 61 that presses the rear end of the inserted part 5 at the tip thereof and a second pin 62 that is arranged above the first pin 61 and presses the rear end of the first pin 61 at the tip thereof.

The pressing mechanism 7 presses the second pin 62, thereby pressing the first pin 61, and presses the inserted part 5 into the tip end side of the mandrel 3. The diameter of the second pin 62 is formed to be larger than that of the throughhole 41 of the first pressing part 40. Therefore, the first pin 61 also has a function as an adjustment spacer for regulating the amount of the downward movement of the pressing member 11. That is, when the second pin 62 is pressed and is moved downwardly by a predetermined amount, the tip of the second pin 62 comes into contact with the rear end of the first pressing part 40, which prevents the second pin 62 from moving downwardly any longer and the movement thereof is regulated.

By adjusting the length of the first pin 61, the amount of the downward movement of the pressing member 11 can be adjusted. Accordingly, the amount of the inserted part 5 pressed into the tip end side of the mandrel 3 can be adjusted, and the extension amount of the diameter of the tapered shaped part 32 of the mandrel 3 can be adjusted with a high accuracy. That is, by adjusting the length of the first pin 61, crowning can be optimally formed in the tooth shape of the material X.

Next, with reference to FIGS. 11 and 12, an operation of the crowning forming apparatus 10 according to the second embodiment will be explained in detail.

(When the Material X is Pressed into the Tip End Side of the Mandrel 3)

Figure 12:
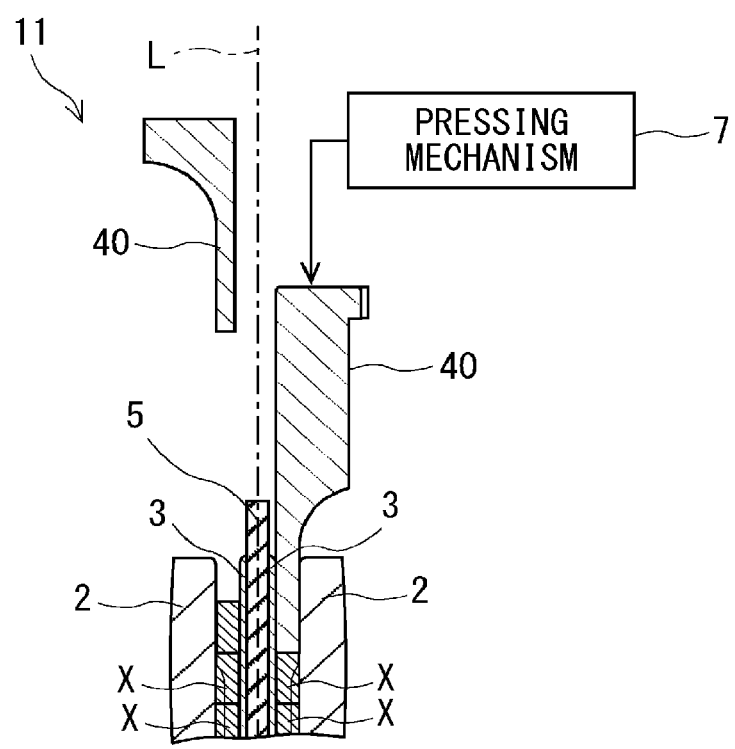
FIG. 12 is a diagram showing a schematic configuration of the crowning forming apparatus according to the second embodiment of the present disclosure.

The pressing mechanism 7 presses the first pressing part 40 to move the first pressing part 40 downwardly so that the state shown in the left side of the central axis line L shown in FIG. 12 is changed to the state shown in the right side of the central axis line L. Accordingly, the first pressing part 40 presses the material X to move the material X downwardly.

(When the Inserted Part 5 is Pressed into the Tip End Side of the Mandrel 3)

As shown in FIG. 11, the first pin 61 is inserted into the throughhole 41 of the first pressing part 40 and the second pin 62 is arranged in the upper end of the first pin 61. The pressing mechanism 7 presses the second pin 62, thereby pressing the first pin 61 and moving the first pin 61 downwardly. Accordingly, the inserted part 5 is moved downwardly and is pressed into the tip end side of the mandrel 3. The pressing mechanism 7 continues to press the second pin 62 to move the first pin 61 downwardly until the tip of the second pin 62 comes into contact with the rear end of the first pressing part 40.

Since the other structures in the second embodiment are substantially the same as those in the aforementioned first embodiment, the same components are denoted by the same reference symbols and detailed descriptions thereof will be omitted.

Third Embodiment

While the first tooth-shaped die part 21 and the second tooth-shaped die part 22 are configured to be incorporated into one equipment in the aforementioned first and second embodiments, the first tooth-shaped die part 21 and the second tooth-shaped die part 22 may be configured to be incorporated into different equipment in a third embodiment.

For example, in a first equipment, the material X is pressed into the first tooth-shaped die part 21, whereby the tooth shape is formed on the outer circumference of the material X by the tooth shape of the first tooth-shaped die part 21. The first equipment may be equipment where the tooth shape can be formed more efficiently at a higher speed.

Next, the material X in which the tooth shape is formed is moved into the second tooth-shaped die part 22 of the second equipment. Then the inner circumferential surface of the material X is outwardly pressed in such a way that the diameter of the central part is extended greatly than the diameter of each of the upper and lower end parts of the material X, whereby the central part of the tooth shape of the material X is pressed against the tooth shape of the inner circumference of the second tooth-shaped die part 22. Accordingly, a natural crowning shape can be formed in the material X by a typical tooth-shaped die shape without requiring a complicated crowning shape that needs to be formed in the die itself in conventional techniques. Since the other structures in the third embodiment are substantially the same as those in the first and second embodiments, the same components are denoted by the same reference symbols and detailed descriptions thereof will be omitted.

While some embodiments of this disclosure have been described above, these embodiments are presented as examples and not intended to limit the scope of the disclosure. These novel embodiments can be implemented in other various forms, and various types of omissions, substitutions, or changes can be made without departing from the spirit of the disclosure. These embodiments and their modifications, as would fall within the scope and spirit of the disclosure, are included in the disclosure provided in the claims and the scope of equivalents thereof.

For example, while the diameter of the central part is greatly extended than the diameter of each of the upper and lower end parts of the material X by inserting the inserted part 5 into the hole 31 of the mandrel 3 and radially opening the tea whisk structure 33 having the barrel shape in the aforementioned embodiments, the present disclosure is not limited to this structure. The inserted part 5 may have, for example, a structure for causing an elastic member having a barrel shape to be radially enlarged. A desired structure may be applied as long as the central part of the tooth shape of the material X can be pressed against the tooth shape of the inner circumference of the second tooth-shaped die part 22 by pressing the inner circumferential surface of the material X outwardly.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A crowning forming method in which a desired crowning is formed in a tooth shape formed on an outer circumference of an annular material by a cylindrical die, wherein
the cylindrical die comprises a first tooth-shaped die part and a second tooth-shaped die part, a tooth shape of the first tooth-shaped die part being formed on an inner circumference to have a constant tooth width from an upper end part of the first tooth-shaped die part to a lower end part of the first tooth-shaped die part and to correspond to a tooth width of a part of the annular material in which the desired crowning has been produced, and a tooth shape of the second tooth-shaped die part being formed on an inner circumference to have a constant tooth width from an upper end part of the second tooth-shaped die part to a lower end part of the second tooth-shaped die part and to correspond to a tooth width of a central part of the annular material, which is a part of the annular material other than the part of the annular material in which the desired crowning has been produced, the method comprising:
forming a tooth shape on an outer circumference of the annular material by the tooth shape of the inner circumference of the first tooth-shaped die part; and
moving the annular material in which the tooth shape is formed into the second tooth-shaped die part, and pressing an inner circumferential surface of the annular material outwardly in such a way that a diameter of the central part of the annular material is greater than the diameter of each of upper and lower end parts of the annular material, thereby pressing the central part of the tooth shape of the annular material against the tooth shape of the inner circumference of the second tooth-shaped die part,
wherein the tooth shape of the first tooth-shaped die part is formed to be smaller than the tooth shape of the second tooth-shaped die part.

2. The crowning forming method according to claim 1, further comprising:
arranging a cylindrical mandrel in a center of the cylindrical die, and
inserting the annular material into the mandrel,
wherein the pressing forms a tooth-shaped crowning on the outer circumference of the annular material when the annular material is positioned around the mandrel.

3. The crowning forming method according to claim 2, further comprising:
inserting a rod-like part having a tip end side formed in a tapered shape into the cylindrical mandrel, the mandrel being configured in such a way that a first diameter of a first portion of the mandrel that corresponds to a central part of the second tooth-shaped die part becomes larger than a second diameter of each of second and third portions of the mandrel that correspond to upper and lower end parts of the second tooth-shaped die part, and
pressing the rod-like part into a tip end side of the mandrel such that the first diameter of the first portion of the mandrel is increased by the tapered shape of the rod-like part, thereby increasing the diameter of the central part of the annular material such that the central part of the annular material extends radially outward with respect to each of the upper and lower end parts of the annular material.

4. A crowning forming method in which a desired crowning is formed in a tooth shape formed on an outer circumference of an annular material by first and second tooth-shaped die parts, wherein
a tooth shape of the first tooth-shaped die part being formed on an inner circumference to have a constant tooth width from an upper end part of the first tooth-shaped die part to a lower end part of the first tooth-shaped die part and to correspond to a tooth width of a part of the annular material in which the desired crowning has been produced,
a tooth shape of the second tooth-shaped die part being formed on an inner circumference to have a constant tooth width from an upper end part of the second tooth-shaped die part to a lower end part of the second tooth-shaped die part and to correspond to a tooth width of a central part of the annular material, which is a part of the annular material other than the part of the annular material in which the desired crowning has been produced, the method comprising:
forming a tooth shape on an outer circumference of the annular material by the tooth shape of the inner circumference of the first tooth-shaped die part; and
moving the annular material in which the tooth shape is formed into the second tooth-shaped die part, and pressing an inner circumferential surface of the annular material outwardly in such a way that a diameter of the central part of the annular material is greater than a diameter of each of upper and lower end parts of the annular material, thereby pressing the central part of the tooth shape of the annular material against the tooth shape of the inner circumference of the second tooth-shaped die part,
wherein the tooth shape of the first tooth-shaped die part is formed to be smaller than the tooth shape of the second tooth-shaped die part.

* * * * *